United States Patent [19]

Kobayashi et al.

[11] 4,382,525
[45] May 10, 1983

[54] SIDE SEAM-COATED WELDED CANS AND PROCESS FOR PREPARATION THEREOF

[75] Inventors: Seishichi Kobayashi, Yokohama; Tatsuo Mori, Kawasaki; Tetsuo Miyazawa, Yokohama; Kazuo Taira, Tokyo; Makoto Horiguchi, Fujisawa; Susumu Takahashi, Yamato, all of Japan

[73] Assignee: Toyo Seikan Kaisha, Ltd., Tokyo, Japan

[21] Appl. No.: 164,148

[22] Filed: Jun. 30, 1980

[30] Foreign Application Priority Data

Jun. 30, 1979 [JP] Japan .................................. 54-82017
Jan. 23, 1980 [JP] Japan .................................. 55-15515

[51] Int. Cl.³ .............................................. H05B 3/68
[52] U.S. Cl. .................................... 220/456; 220/75;
428/35; 428/458; 428/460; 428/461; 428/463;
428/469; 428/586; 428/594
[58] Field of Search .................... 428/35, 36, 458, 460,
428/461, 463, 469, 586, 594; 220/75, 79, 456

[56] References Cited

U.S. PATENT DOCUMENTS

| | | | |
|---|---|---|---|
| 3,618,817 | 11/1971 | Troughton | 220/75 |
| 4,033,474 | 7/1977 | Rentmeester | 220/75 |
| 4,034,132 | 7/1977 | Manuel | 428/35 |
| 4,065,023 | 12/1977 | Rentmeester et al. | 220/75 |
| 4,193,530 | 3/1980 | Holmes | 220/75 |

*Primary Examiner*—Allan Lieberman
*Attorney, Agent, or Firm*—Sherman & Shalloway

[57] ABSTRACT

Disclosed is a side seam-coated welded can comprising a welded can body having a seam on the side face and a resin coating layer covering at least one surface side of the seam, wherein said coating layer comprises a thermosetting resin and a thermoplastic resin having a softening point of 50° to 300° C. as determined according to the ring and ball method, at a volume ratio ranging (A) from 95/5 to 25/75 or (B) from 20/80 to 1/99, and one of said two resins is present in the coating in the form of a continuous phase and at least a part of the other resin is present in the coating in the form of fine dispersed particles.

This can is excellent in corrosion resistance and processability.

8 Claims, 4 Drawing Figures

SIDE SEAM-COATED WELDED CANS AND PROCESS FOR PREPARATION THEREOF

BACKGROUND OF THE INVENTION (1) Field of the Invention

The present invention relates to a welded can having a coated side seam and a process for the preparation thereof. More particularly, the invention relates to a welded can excellent in the corrosion resistance and processability, in which a coating of a thermosetting resin and a thermoplastic resin is formed on a seam by one step and in this coating, one of the two resins is present as a continuous phase and the other resin is present as a dispersed phase, and also to a process for the preparation of such can.

(2) Description of the Prior Art

As the conventional process most popularly adopted for the manufacture of can bodies, there can be mentioned a process comprising forming a metallic can blank cut in a predetermined size into a cylinder, lapping both the edges of the blank and bonding the lapped edges to form a side seam by welding, soldering or using an adhesive.

In a can body prepared according to this process, the cut edge of the blank is exposed on the inner face side of the can body, and in order to prevent corrosion of the can blank and control dissolution of the metal into the packed content, it is very important to coat this exposed cut edge.

Various processes for coating and protecting side seams, especially cut edges, have been heretofore proposed. As the process capable of attaining considerable effects, there can be mentioned a process in which the cut edge of a can blank is coated and protected in advance with a tape of an adhesive such as a polyamide. This process can be applied to the manufacture of bonded seam cans, but this process cannot be practically utilized if the seam is exposed to a very high temperature as in the case of welded seam cans.

As means for coating and protecting the side seam of a welded seam can, there is known a process in which a paint in the form of a solution or powder is coated on the inner or outer face side of the seam after formation of a can body. However, known paints used for this purpose are insufficient in the combination of adhesion to the side seam, the barrier property against corrosive components and processability, for example, adaptability to the double-seaming operation, and the object of completely coating the stepped cut edge in the side seam cannot be satisfactorily attained by these known paints.

For example, a coating material comprising a thermoplastic resin has excellent processability, but the thermoplastic resin is poor in adhesion to the side seam and insufficient in the above-mentioned barrier property. Accordingly, a side seam coated with a thermoplastic resin is readily corroded by the content or the like and defects such as sulfide blackening are caused.

A paint comprising a thermosetting resin is excellent in the adhesion to the side seam and the barrier property to corrosive components, but has inferior processability. In a can body having a side seam coated with a thermosetting resin, dissolution of the metal from the side seamed portion is often observed.

When these known paints are used, whether they comprise a thermosetting resin or a thermoplastic resin, they flow in the form of a solution or in the molten state so that the stepped portion of the cut edge is levelled. Therefore, the coating is not present in the angular portion of the cut edge or the thickness of the coating is extremely reduced in this portion. Furthermore, air bubbles are readily included in the coating of the stepped portion. Thus, it is substantially impossible to coat the cut edge of the can blank completely.

If there is present an exposed metal portion in a can body, a defective can such as a hole-pierced can or a hydrogen-swollen can is formed according to its content, and furthermore, the flavor of the content is drastically degraded.

SUMMARY OF THE INVENTION

We found that when a paint comprising a solution of a thermosetting resin as the dispersion medium and particles of a specific thermoplastic resin as the dispersed phase and containing the thermosetting resin and the thermoplastic resin at a volume ratio as solids ranging (A) from 95/5 to 25/75 or (B) from 20/80 to 1/99 is applied to the seam of a welded can, it is possible to completely coat even the angular portion of the cut edge present on the side seam and perform the coating and baking operations without bubbling. It also was found that if this coating process is adopted, there can be formed a coating in which, according to the above-mentioned volume ratio, one of the thermosetting resin and the thermoplastic resin is present in the form of a continuous phase and at least a part of the other resin is present in the continuous phase in the form of fine dispersed particles, and that the coating having this specific dispersion characteristic is excellent in combination of the adhesion, corrosion resistance and processability.

It is therefore a primary object of the present invention to provide a side seam-coated welded can in which the side seam portion of the welded can is entirely coated completely and this coating has excellent adhesion, corrosion resistance and processability and also provides a process for the preparation of this side seam-coated welded can.

Another object of the present invention is to provide a welded can in which the welded seam is effectively protected with a coating in which a thermosetting resin and a thermoplastic resin are present in a specific dispersion state, and also provide a process for the preparation of this can.

Still another object of the present invention is to provide a process for the preparation of side seam-coated welded cans in which a piece of conventional coating equipment that has been used for the coating operation using known solution type paints can be used without any particular modification and a thick coating free of bubbles or foams can be formed entirely on the side seam of a welded can.

In accordance with one fundamental aspect of the present invention, there is provided a side seam-coated welded can comprising a welded can body having a seam on the side face and a resin coating layer covering at least one surface side of the side seam, wherein said coating layer comprises a thermosetting resin and a thermoplastic resin having a softening point of 50° to 300° C. as determined according to the ring and ball method, at a volume ratio ranging (A) from 95/5 to 25/75 or (B) from 20/80 to 1/99, and one of said two resins is present in the coating in the form of a continuous phase and at least a part of the other resin is present in the coating in the form of fine dispersed particles.

In accordance with another fundamental aspect of the present invention, there is provided a process for the preparation of side seam-coated welded cans, which comprises applying a resin paint to a welded can body having a seam formed on the side face thereof at least on one surface of said seam and baking the coated paint to form a coating covering said side seam, wherein said resin paint comprises a dispersion medium composed of a solution of a thermosetting resin and a dispersed phase of resin particles having a number average particle size of 0.1 to 80 μm and being composed of a thermoplastic resin having a softening point of 50° to 300° C. as determined according to the ring and ball method, the volume ratio of the thermosetting resin to the themoplastic resin in the coating ranges (A) from 95/5 to 25/75 or (B) from 20/80 to 1/99, and the paint coated on the side seam is baked under such conditions that evaporation of a solvent in the solution of the dispersion medium is first caused and softening of the thermoplastic resin is then caused.

BRIEF DESCRIPTION OF THE DRAWINGS

In the drawings, reference numbers 1, 2, 5, 6, 7, 8, 9, 11, 14, 15 and 21 represent a metallic can blank, a side seam, a resin coating layer, a continuous phase of a thermosetting resin, thermoplastic resin particles, a continuous phase of a thermoplastic resin, a continuous thin layer of a thermosetting resin, dispersed particles of a thermosetting resin, an iron-tin alloy layer, an oxide layer and a magnetite layer, respectively.

DETAILED DESCRIPTION OF THE PREFERRED EMBODIMENTS

Figure 1:
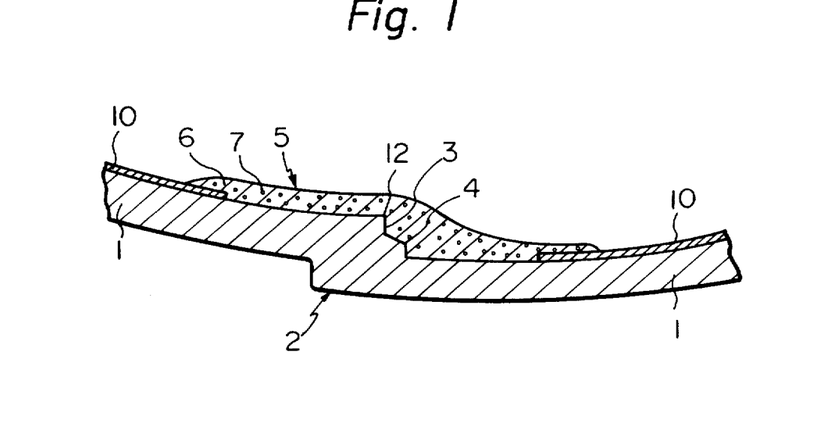
FIG. 1 is an enlarged sectional view showing the main part of one embodiment of the side seam-coated welded can according to the present invention.
Figure 2:
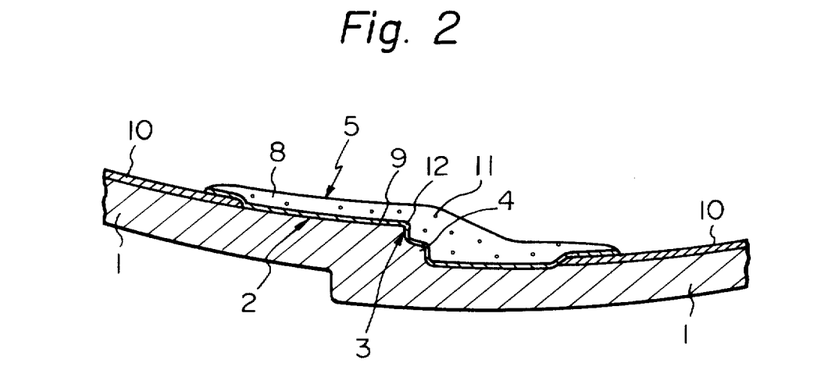
FIG. 2 is an enlarged sectional view showing the main part of another embodiment of the side seam-coated welded can according to the present invention.

Referring to FIGS. 1 and 2 showing the main parts of embodiments of the side seam-coated welded can according to the present invention, a metallic can blank 1 cut in a predetermined size is formed into a cylinder, and the edges are lapped and welded to form a seam 2. The inner face of the so formed can body, except the seam 2 or its adjoining portion, may be coated with a protecting resin layer 10.

A cut edge 3 of the blank and a protrusion 4 formed by a pressure applied to the melt of the metal blank at the welding step are present on the seam 2 located on the inner face side of the can body. A resin layer 5 is formed on the seam 2 so as to cover the cut edge 3 and protrusion 4.

One of the important features of the present invention is that this resin layer 5 is formed of a thermosetting resin and a thermoplastic resin at the above-mentioned specific volume ratio and one of the two resins is present in the form of a continuous phase and at least a part of the other resin is present in the form of fine particles dispersed in this continuous phase. In the present invention, the kind of the resin constituting the continuous phase is determined by the volume ratio of both the resins. More specifically, when the thermosetting resin and the thermoplastic resin are present at a volume ratio (A) ranging from 95/5 to 25/75, especially from 93/7 to 30/70, the thermosetting resin forms the continuous phase and the thermoplastic resin forms the dispersed phase. When the thermosetting resin and the thermoplastic resin are present at a volume ratio (B) ranging from 1/99 to 20/80, especially, from 2/98 to 15/85, the thermoplastic resin forms the continuous phase and at least a part of the thermosetting resin forms the dispersed phase.

FIG. 1 illustrates an embodiment of the dispersion state formed by the volume ratio (A). More specifically, the resin coating layer 5 comprises a continuous phase 6 composed of a thermosetting resin and a dispersed phase 7 composed of thermoplastic resin particles having a number average particle size of 0.1 to 80 μm.

FIG. 2 illustrates an embodiment of the dispersion state formed by the volume ratio (B). More specifically, the thermoplastic resin is present in the form of a continuous phase 8 in the coating layer, a part of the thermosetting resin is present in the form of a continuous very thin layer 9 in the interface between the continuous phase 8 of the thermoplastic resin and the inner face side of the seam, and the remaining part of the thermosetting resin is present in the form of fine dispersed particles 11 in the continuous phase 8.

As pointed out hereinbefore, thermosetting resins have excellent adhesion to a metal and barrier property to corrosive components but are poor in processability, and thermoplastic resins have excellent processability but poor adhesion and barrier properties.

Furthermore, when a solution of a thermosetting resin alone is coated on the side seam, the solution flows to the stepped portion such as the cut edge 3 or protrusion 4, and as pointed out hereinbefore, the coating breaks in the angular portion 12 of the cut edge 3 or the thickness of the coating is reduced in this angular portion 12.

In contrast, when the thermosetting resin solution is used as the dispersion medium and the thermoplastic resin particles are used as the dispersed phase and when the volume ratio of the thermosetting resin and the thermoplastic resin is controlled within the above-mentioned range according to the present invention, by virtue of thixotropic characteristics of this paint, the paint can be thickly applied even to the angular portion of the seam 2 and the coating and baking operations can be performed in this thickly applied state. Furthermore, in the portion where the paint is thus thickly coated, the thermoplastic resin particles effectively retain the thermosetting resin solution on the surfaces thereof, and this solution flows to the vacant space of the stepped portion to control the levelling tendency of the coating.

Accordingly, if the above-mentioned paint is used according to the present invention, even in the angular portion 12 of the cut edge, the thickness of the coating is substantially the same as in other portions, and the cut edge 3 can be coated entirely.

In the above-mentioned embodiment (A), the continuous phase 6 (see FIG. 1) of the thermosetting resin is maintained until completion of the baking operation, and the dispersed particles of the thermoplastic resin are softened or molten under baking conditions and complete adhesion is produced between the thermosetting resin phase and the thermoplastic resin phase, whereby the mechanical strength, the impact resistance and the processability can be remarkably improved. Furthermore, by this complete adhesion between the two resin phases, the barrier property to corrosive components can be more prominently improved.

According to this preferred embodiment of the present invention, by including the thermosetting resin in the form of a continuous phase in the coating, the adhesion of the coating to the side seam and the barrier property to corrosive components such as water, acids, oxygen and hydrogen sulfide can be remarkably improved, and at the same time, by including thermoplastic resin particles in the form of a dispersed phase in the coating, an excellent processability sufficient to resist the double-seaming or bead-processing operation can be imparted to the coated side seam.

In the above-mentioned embodiment (B), with evaporation of the solvent, a part of thermosetting resin is deposited in the form of a continuous very thin layer on the metal face of the seam and the remaining part of the thermosetting resin is deposited on the surfaces of the thermoplastic resin particles. In this state, baking of the coating is further advanced to melt the thermoplastic resin particles. By controlling the volume ratio of both the resins within the above-mentioned range (B), the thermoplastic resin is formed into a continuous phase and the thermosetting resin left on the surfaces of the particles is formed into a fine dispersed phase. The phase reversion is thus caused, and finally, curing of the thermosetting resin is completed.

According to this latter-mentioned embodiment, since a part of the thermosetting resin is present in the form of a thin layer adhering closely to the entire metal face of the side seam, the adhesion of the coating and the corrosion resistance can be remarkably improved. Furthermore, the thickness of this thermosetting resin thin layer is controlled within the range of 0.01 to 5 $\mu$m, and a continuous phase of the thermoplastic resin layer is formed on this thin layer. Accordingly, processability is remarkably improved, and even if the side seam-coated welded can is subjected to such a severe treatment as necked-in treatment, dissolution of the metal from the side seam or corrosion is advantageously controlled.

In order to attain the objects of the present invention, it is important that the thermoplastic resin particles used for the paint of the present invention should have a softening point of 50° to 300° C., especially 120° to 270° C., as determined according to the ring and ball method. If the softening point of the thermoplastic resin is lower than 50° C., both the resins are formed into a homogeneous mixture and the specific dispersion state of the present invention can hardly be produced, with the result that the cut edge-coverage characteristic, the processability and the corrosion resistance are drastically reduced. On the other hand, if the softening point of the thermoplastic resin is higher than 300° C., the processability is much lower than the processability attained when the softening point is within the range specified in the present invention, and furthermore, mutual bonding of both the resins in the interface becomes difficult, resulting in reduction of the barrier property.

It is preferred that the number average particle size of the thermoplastic resin particles be 0.1 to 80 $\mu$m, especially 0.5 to 50 $\mu$m. If the number average particle size is either smaller than 0.1 $\mu$m or larger than 80 $\mu$m, an optimum combination of the thick coating property and the control of flow of the thermosetting resin solution cannot be obtained. Especially in the above-mentioned embodiment (A), if the number average particle size is smaller than 0.1 $\mu$m, since the grain area per unit volume of the coating becomes too large, corrosion such as sulfide blackening by the content is easily advanced because of reduction of the barrier property, and also the processability of the coating after curing is degraded. If the number average particle size is larger than 80 $\mu$m, it is difficult to form uniformly in the coating a dispersion texture comprising a continuous phase of the thermosetting resin and a dispersed phase of the thermoplastic resin, and the effect of completely coating the cut edge portion, the processability and the corrosion resistance tend to drastically decrease.

This tendency is observed also in the embodiment (B) where the phase inversion is caused between the thermoplastic resin particles and the thermosetting resin solution.

In the paint used in the present invention, if the volume ratio of the thermosetting resin and the thermoplastic resin is intermediate between the above range (A) and the above range (B), it is very difficult to form a continuous phase of one of the two resins, and therefore, complete coating of the cut edge becomes very difficult and the processability is drastically reduced. If the volume ratio of the thermoplastic resin is lower than the lower limit of the above range, complete coating of the cut edge becomes difficult and prevention of corrosion of the cut edge portion becomes very difficult. Moreover, the processability of the resulting coating is degraded. If the volume ratio of the thermosetting resin is lower than the lower limit of the above range, the adhesion of the coating to the side seam and the corrosion resistance of the cut edge are reduced.

In order to improve the interfacial adhesion between both the resins, it is preferred that a thermoplastic polymer containing in the main chain or side chain a carboxyl group derived from a carboxylic acid, a carboxylic acid salt, a carboxylic acid anhydride, a carboxylic acid ester, a carboxylic acid amide, a carbonic acid ester, urea or urethane can be used as the thermoplastic resin. When a thermoplastic polymer containing carboxyl groups at a concentration of 12 to 1400 meq, especially 50 to 1200 meq, per 100 g of the polymer is employed, best results are obtained with respect to the processability and the corrosion resistance.

This thermoplastic polymer can be obtained by including a monomer having a functional group such as mentioned above into the main chain by polymerization or copolymerization or by coupling such monomer to the thermoplastic polymer by a grafting or terminal treatment. Furthermore, in case of a hydrocarbon type polymer such as an olefin resin, a thermoplastic resin having carbonyl groups at the above-mentioned concentration can be formed by subjecting this resin to an oxidizing treatment.

Appropriate examples of such thermoplastic polymers are described below, though thermoplastic polymers that can be used in the present invention are not limited to those described below.

(a) Polyesters comprising recurring units represented by the following general formula:

wherein R₁ stands for an alkylene group having 2 to 6 carbon atoms and R₂ stands for an alkylene or arylene group having 2 to 24 carbon atoms.

For example, there can be mentioned polyethylene adipate, polyethylene sebacate, polyethylene terephthalate, polytetramethylene isophthalate, polyethylene terephthalate/isophthalate, polytetramethylene terephthalate, polyethylene/tetramethylene terephthalate and polyethylene/hydroxybenzoate.

(b) Homopolymers or copolymers of monomers represented by the following formula:

wherein R₃ stands for a hydrogen atom or a lower alkyl group and R₄ stands for a hydrogen atom or an alkyl group having 1 to 12 carbon atoms, and copolymers of monomers of the formula (3) with olefins or other vinyl monomers, and acryl-modified polyolefins.

For example, there can be mentioned polyacrylic acid esters, polymethacrylic acid esters, ethylene/acrylic acid ester copolymers, acrylic acid ester/acrylic acid copolymers, ethylene/acrylic acid ester/acrylic acid copolymers, ethylene/acrylic acid copolymers, styrene/methacrylic acid ester/acrylic acid copolymers, acrylic acid ester/vinyl chloride copolymers, acrylic acid ester-grafted polyethylene, methacrylic acid ester/vinyl chloride copolymers, styrene/methacrylic acid ester/butadiene copolymers and methacrylic acid ester/acrylonitrile copolymers.

(c) Copolymers of vinyl esters represented by the following general formula:

wherein R₅ stands for a hydrogen atom, an alkyl group or a phenyl group, with olefins or other vinyl monomers, and partially saponified products thereof.

For example, there can be mentioned partially saponified ethylene/vinyl acetate copolymers, ethylene/vinyl propionate copolymers, ethylene/vinyl acetate copolymers, acrylic acid ester/vinyl acetate copolymers and vinyl chloride/vinyl acetate copolymers.

(d) Ionomers, that is, resins obtained by neutralizing copolymers of olefins with unsaturated carboxylic acids, optionally with other vinyl monomers, with an alkali metal, an alkaline earth metal or an organic base.

For example, there can be mentioned Surlyns manufactured and marketed by Du Pont Co., U.S.A.

(e) Copolymers of maleic anhydride with other vinyl monomers and maleic anhydride-modified polyolefins.

For example, there can be mentioned maleic anhydride/styrene copolymers, maleic anhydride-modified polypropylene and maleic anhydride-modified polyethylene.

(f) Polycarbonates having recurring units represented by the following formula:

wherein R₆ represents a hydrocarbon group having 8 to 15 carbon atoms.

For example, there can be mentioned poly-p-xylene glycol biscarbonate, poly-dihydroxydiphenylmethane carbonate, polydihydroxydiphenylethane carbonate, poly-dihydroxydiphenyl-2,2-propane carbonate and poly-dihydroxydiphenyl-1,1-ethane carbonate.

(g) Polyamides having recurring units represented by the following general formula:

wherein n is a number of from 3 to 13 and m is a number of from 4 to 11.

For example, there can be mentioned poly-ω-aminocaproic acid, poly-ω-aminoheptanoic acid, poly-ω-aminocaprylic acid, poly-ω-aminopelargonic acid, poly-ω-aminodecanoic acid, poly-ω-aminoundecanoic acid, poly-ω-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydodecamethylene azelamide and polytridecamethylene azelamide.

(h) Polyureas having recurring units represented by the following general formula:

wherein R₇ and R₈ stand for an alkylene group having 1 to 13 carbon atoms.

For example, there can be mentioned polyhexamethyleneurea, polyheptamethylene-urea, polyundecamethylene-urea and polynonamethylene-urea.

(i) Polyurethanes and polyureaurethanes represented by the following general formula:

(10)

(11)

wherein $R_9$ stands for an alkylene group having 3 to 24 carbon atoms or a polyether or polyester residue having 3 to 24 carbon atoms, $R_{10}$ stands for an alkylene or arylene group having 3 to 24 carbon atoms, $R_{11}$ stands for an alkylene or arylene group having 1 to 13 carbon atoms, and k is a number of 0 or 1.

For example, there can be mentioned polytetramethylenehexamethylene-urea, polyhexamethylene-tetramethylene-urea, and polyureaurethanes formed by chain-extending isocyanate-terminated polyesters or polyethers with a diamine or water.

(j) Resin particles obtained by oxidizing particles of polyethylene, polypropylene or a crystalline ethylene/propylene copolymer with oxygen, ozone or other oxidant.

As the thermoplastic resins preferred for attaining the objects of the present invention, there can be mentioned, in an order of importance, polyesters, polycarbonates, polyamides, ionomers and acid-modified polyolefins.

These resins should have at least a film-forming molecular weight. Known additives such as ultraviolet absorbents, stabilizers, lubricants, antioxidants, pigments, dyes and antistatic agents may be incorporated in these resin particles according to known recipes, if desired.

Optional means can be adopted for pulverizing the thermoplastic resin into particles having the above-mentioned particle size. For example, in case of addition polymers, resin particles having a predetermined particle size can be obtained by emulsion-polymerizing constituent monomers. Furthermore, there may be adopted a method in which the resin is pulverized under cooling, a method in which the resin is dissolved at a high temperature and the solution is cooled to precipitate the resin in the form of particles, a method in which a resin solution is brought into contact with a non-solvent to coagulate and precipitate the resin in the form of particles, and a method in which a resin solution is sprayed into a gas current to precipitate the resin in the form of particles. The resin particles prepared according to these methods may be sieved and classified to obtain particles having a predetermined particle size, if necessary.

Any of thermosetting resins customarily used in the field of the manufacture of paints can be used as the thermosetting resin in the present invention. As preferred thermosetting resins, there can be mentioned, for example, phenol-formaldehyde resins, furan-formaldehyde resins, xylene-formaldehyde resins, ketone-formaldehyde resins, urea-formaldehyde resins, melamine-formaldehyde resins, alkyd resins, unsaturated polyester resins, epoxy resins, bismaleimide resins, triallyl cyanurate resins, thermosetting acrylic resins, silicone resins and oleoresins. These resins may be used singly or in the form of a mixture of two or more of them.

From the viewpoints of adhesion to the side seam and corrosion resistance, it is preferred that a coating-forming resin comprising an epoxy resin component and at least one thermosetting resin selected from the group consisting of phenolic resins, urea resins, melamine resins and thermosetting acrylic resins can be used as the thermosetting resin. This coating-forming resin may be used in the form of a mixture or precondensate of the constituent resins.

The paint used in the present invention can be easily prepared by dissolving the above-mentioned thermosetting resin in an appropriate organic solvent and dispersing thermoplastic resin particles in the solution. A solvent capable of dissolving the thermosetting resin but incapable of dissolving the thermoplastic resin is chosen as the solvent. Ordinarily, there are used aromatic solvents such as xylene and toluene, ketone type solvents such as acetone, methylethyl ketone and cyclohexanone, alcohol type solvents such as ethanol and butanol, cyclic and linear ethers such as tetrahydrofuran, dioxane and cellosolves, and esters such as ethyl acetate and butyl acetate. These solvents may be used singly or in the form of a mixture of two or more of them. The thermoplastic resin particles may be added in the form of a dispersion to the thermosetting resin solution.

In order to obtain a thick coating completely covering the cut edge portion, it is preferred that when the paint used in the present invention is dropped on a glass sheet in an amount of $0.2$ mm$^3$ at $25°$ C. and allowed to stand for 1 minute, the contact angle be $18.5°$ to $45°$, especially $19.0°$ to $43°$. The solid concentration of the paint is appropriately chosen within the range of 5 to 50% according to the combination of the resins so that a good combination of the adaptability to the coating operation and the thick coating property can be obtained.

As the material constituting the can body, there can be mentioned, for example, an untreated steel plate (black plate), electrically plated and melt-plated steel plates such as a tinplate, a zinc-plated steel plate and a chromium-plated steel plate, steel plates chemically treated with chromic acid, phosphoric acid and the like, and steel plates electrolytically treated with chromic acid. Furthermore, a light metal sheet such as an aluminum sheet can be used.

The side seam can be advantageously formed by electric resistance welding. Formation of a side seam by electric resistance welding is accomplished by forming a can blank into a cylinder and passing the lapped edges through between a pair of electrode rollers or passing the lapped edges between a pair of upper and lower electrodes through an electrode wire. In order to prevent formation of porous metal oxides on the surface of the side seam and improve the adhesion of the protecting paint, it is preferred that the welding operation be carried out in an inert atmosphere and this inert atmosphere be maintained until the surface temperature of the welded portion is lowered to $550°$ C. As the inert atmosphere, there can be used, for example, nitrogen, argon, neon, hydrogen and carbon dioxide. It is ordinarily preferred that the welding operation be carried out while holding the portion to be welded in a current of an inert gas such as mentioned above, but the welding operation may be carried out in a sealed vessel filled with the inert gas.

Figure 3:
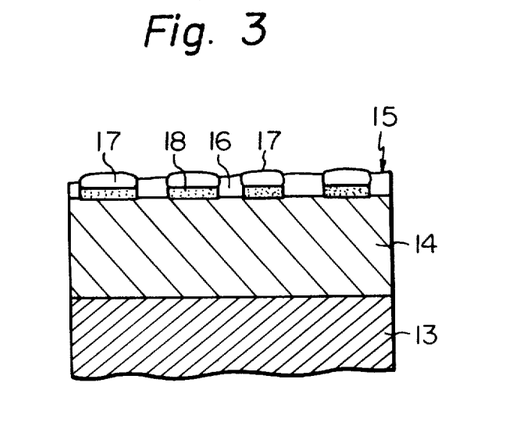
FIG. 3 is an enlarged sectional view showing the surface portion of a side seam formed on a welded can of tinplate.

In accordance with another preferred embodiment of the present invention, the above-mentioned side seam-coating paint is applied to a can body having a side seam formed by welding of a tinplate, the inner and outer surface portions of said side seam comprising an outermost layer composed of an oxide, which has a thickness of 50 to 400 Å, and a subsequent intermediate iron-tin alloy layer having a thickness corresponding to 5 to 100% of the thickness of the total tin layer in the starting tinplate.

Referring to FIG. 3 illustrating in an enlarged manner the sectional structure of the surface portion of this welded tinplate can, an iron-tin alloy layer 14 is formed on a steel substrate 13 and an oxide layer 15 is formed on the alloy layer 14. One of the characteristic features of this seam is that the thickness of the oxide layer 15 is restricted to 50 to 400 Å and the thickness of the iron-tin alloy layer corresponds to 5 to 100%, especially 15 to 100%, of the thickness of the total tin layer in the starting tinplate can blank 1.

In ordinary tinplate can blanks, the thickness of the total tin layer is about 0.38 to 1.52 μm, and an iron-tin alloy layer is inevitably present between the metallic tin layer and the steel substrate. The thickness of this iron-tin alloy layer is relatively small and corresponds to 5 to 30% of the thickness of the total tin layer, though the thickness differs to some extent according to the tinplate-manufacturing process. In conventional welded cans, the metallic tin layer is substantially removed on the surface of the welded portion for the reasons described hereinbefore, and instead of the removed metallic tin layer, there is formed an iron oxide layer having a thickness of 700 to 1000 Å.

In contrast, in the welded can of the above-mentioned type according to the present invention, the thickness of the iron-tin alloy layer is increased to a level corresponding to 5 to 100% of the thickness of the total tin layer and the thickness of the oxide layer is controlled to the above-mentioned low level of 50 to 400 Å. In the welded can of this type according to the present invention, since the thickness of the iron-tin alloy layer having a fine and compact texture is increased, the corrosion resistance of the bonded portion is remarkably increased and the processability of the surface of the bonded portion and the adhesion of the resin coating to the surface of the bonded portion are highly improved. Furthermore, since the oxide layer which is very thin and hence, has no bad influence on the processability is formed on this alloy layer, the adhesion of the resin coating to the side seam is remarkably enhanced, with the result that even if the welded can is subjected to a severe processing treatment or hydrothermal treatment (for example, the retort sterilization treatment), a high adhesion of the side seam to the resin coating 5 and a high corrosion resistance of the side seam can be maintained.

The thickness of the iron-tin alloy layer 14 can be measured by the X-ray fluorometry. This thickness can be measured also by a scanning type electron microscope or an X-ray microanalyzer.

In the present embodiment, the composition of the iron-tin alloy layer 14 is not particularly critical, but the Fe/Sn atomic ratio is ordinarily in the range of from 1/1 to 1/2. The oxide layer 15 consists mainly of a continuous layer 16 of iron oxide, but a tin oxide layer 17 or a metallic tin layer 18 may be present in the form of islands or continuous layers.

If the thickness of the iron-tin alloy layer is too small and below the above-mentioned range, no satisfactory results can be obtained with respect to the adhesion of the coating, the corrosion resistance and the processability. If the thickness of the oxide layer is too large and exceeds the above-mentioned range, no satisfactory results can be obtained with respect to the above characteristics. Furthermore, if the thickness of the oxide layer exceeds the above-mentioned range, also the appearance characteristic is degraded with reduction of the adhesion of the paint.

In the side seam-coated welded can of the present invention, the width of the side seam may be relatively small and is ordinarily in the range of 0.2 to 1.2 mm, though the width of the side seam differs to some extent according to the can diameter. Accordingly, the amount used of the can blank can be reduced. This is another advantage attained according to the present invention. As the tinplate blank, there can be used either a tin melt-plated steel plate or an electrically tin-plated steel plate. Either a reflow tinplate or a non-reflow tinplate can be used as the electrically tin-plated steel plate. The amount deposited of tin is preferably in the range of 1.12 to 11.2 $g/m^2$, and the thickness of the tinplate is preferably in the range of from 0.15 to 0.50 mm.

In order to form the welded side seam defined according to the present invention, it is important that the above-mentioned welding means be adopted and that the rate of lowering the surface temperature of the side seam from the welding temperature (which is in the range of from about 750° to about 1450° C.) to 550° C. should be in the range of 100° to 900° C./sec. This cooling rate has close relations to the thickness of the iron-tin alloy layer and the thickness of the oxide layer. When the cooling rate is higher than 900° C./sec, the thickness of the alloy layer is smaller than the value specified in the present invention, and if the cooling rate is lower than 100° C./sec, the thickness of the oxide layer tends to exceed the range defined in the present invention. If the cooling rate is controlled with the above-mentioned range, it is possible to form tin-iron alloy and oxide layers having thickness characteristics most preferred for various characteristics.

Figure 4:
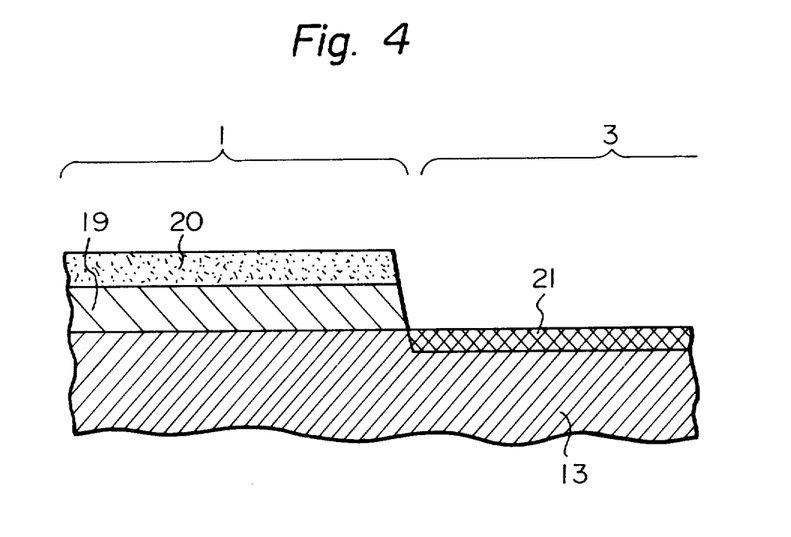
FIG. 4 is an enlarged sectional view showing the side seam and peripheral surface portion of a welded can of tin-free steel (TFS).

In accordance with still another preferred embodiment of the present invention, the above-mentioned paint is applied to a side seam welded can formed by welding the side portions of a can blank (tin-free steel can blank) comprising a steel plate substrate, a metallic chromium layer formed on the substrate and a chromium oxide layer formed on the metallic chromium layer to form a side seam having a steel substrate-exposed layer which has a thickness of 50 to 800 Å and is composed of a fine and compact steel oxide consisting mainly of magnetite.

Referring to FIG. 4 illustrating in an enlarged manner the side seam of this welded can and the adjoining portion thereof, the tin-free steel blank 1 (hereinafter referred to as "TFS blank") comprises a steel plate substrate 13, a metallic chromium layer 19 and a chromium oxide surface layer 20. In the area of the side seam 3, these chromium-containing layers are removed and the steel substrate 13 is exposed to form a steel oxide layer 21.

The steel substrate 13 in the TFS blank is formed, for example, by cold rolling of low-carbon steel, and the thickness of the metallic chromium layer 19 or chromium oxide layer 20 or the thickness ratio of the two layers considerably differs according to the intended use of the welded can or the volume of the can. Generally, the metallic chromium layer has an amount deposited of 10 to 100 mg/m$^2$, especially 20 to 80 mg/m$^2$, and the chromium oxide layer has an amount deposited of 0.5 to 20 mg/m$^2$, especially 1 to 10 mg/m$^2$.

One of the important features of this TFS can is that the above-mentioned steel oxide layer 21 is formed of a fine and compact steel oxide consisting mainly of magnetite (Fe$_3$O$_4$) and the thickness of this layer is controlled to 50 to 800 Å, especially 50 to 400 Å.

In the conventional welded TFS can, on the steel substrate exposed surface to be formed into a side seam, a steel oxide layer having a thickness of 1000 to 3000 Å is formed, and this oxide layer is very porous and in the chemical composition of this oxide layer, the ratio of the oxygen atoms to the Fe atoms is relatively high. This oxide layer is readily influenced by the atmosphere. For example, if this oxide layer is brought into contact with air for a relatively short time, it is readily converted to hydrous ferric oxide (so-called red rust).

In contrast, in the welded can of the above-mentioned type according to the present invention, since the steel oxide layer is formed of a fine and compact oxide consisting mainly of magnetite and the thickness of this layer is controlled to a very small level of 50 to 800 Å, the adhesion of the coating and the corrosion resistance are remarkably improved, and these excellent characteristics of the seam can be maintained even after processing. For example, when the thickness of this magnetite layer is smaller than 50 Å, the adhesion of the coating is reduced, and if the thickness of the magnetite layer is larger than 800 Å, the adhesion of the coating and the corrosion resistance after processing are degraded. Moreover, various advantages are attained with respect to the anti-corrosive characteristic by the feature that the oxide layer is formed of a fine and compact oxide consisting mainly of magnetite.

The fact that the steel oxide layer is formed of magnetite can be confirmed by X-ray diffractiometry or electron beam diffractiometry. The chemical composition of the oxide layer can be determined by the ESCA method (electron spectroscopy for chemical analysis) in which the surface is etched with Ar gas and the atomic concentration ratio of O and Fe is measured. The thickness of this steel oxide layer can be measured by a scanning type electron microscope or an X-ray microanalyzer.

This welded TFS can is formed by forming a TFS can blank into a cylinder and passing the lapped edges through a pair of electrode rollers or passing the lapped edges between a pair of upper and lower electrode rollers through an electrode wire. It is important that this welding operation should be carried out in an inert atmosphere and this inert atmosphere should be maintained until the surface temperature of the welded portion is lowered to 550° C. Two excellent effects of reducing the thickness of the oxide layer and converting the steel oxide to magnetite can be attained by adoption of an inert atmosphere, that is, a non-oxidizing atmosphere, either as the welding atmosphere or as the atmosphere of the subsequent gradually cooling zone.

Application of the paint to the side seam of the can body and the adjoining portion thereof is performed by known means such as roller coating, spray coating, brush coating, flow coating and dip coating, and special means such as powder coating need not be adopted and existing coating equipment can be used without any particular modification. This is still another prominent advantage that can be attained according to the present invention.

In order to completely coat even the angular portion of the cut edge of the side seam, it is preferred that the thickness of the coating in the angular portion of the cut edge after baking be 2 to 50 μm. When the above-mentioned paint of the present invention is used, such coating can easily be formed.

According to the present invention, the so formed coating is heated at a temperature higher than the softening point or melting point of the thermoplastic resin to effect curing of the coating. As heating means, there can be employed direct flame heating, hot air oven heating, induction heating, resistance heating and infrared ray heating. The curing conditions are appropriately chosen from curing temperatures of 150° to 400° C. and curing times of 1 second to 20 minutes so that a net-like structure is formed in the thermosetting resin by cross-linking and a sufficient bonding is formed between the thermosetting resin and the thermoplastic resin in the grain boundary.

From the viewpoint of the mechanical strength of the coating, it is preferred that the thermoplastic resin used be crystalline. In this case, in order to improve the processability and the barrier property (the corrosion resistance by good adhesion in the grain boundary), it is preferred that the temperature of the coating be rapidly lowered from the baking temperature to a level lower by at least 10° C. than the crystallizing temperature of the thermoplastic resin within 10 seconds, especially 1 second, so as to inhibit or control crystallization of the thermoplastic resin in the coating. This rapid cooling can easily be accomplished by bringing the baked coating into contact with cooling water, a liquefied nitrogen current, cold air or other cooling medium or by bringing the side seam of the baked coating into contact with a cooling apparatus such as a chilling roller.

The side seam-coated welded can of the present invention can be used in various fields as a vacuum can which is subjected to retort sterilization of the content, an inner pressure can in which a carbonated drink or the like is packed or an aerosol can.

The present invention will now be described in detail with reference to the following Examples that by no means limit the scope of the invention.

Thermosetting resin solutions used in the Examples were prepared according to the methods described below.

(1) Epoxy-Urea Type Resin Solution:

70 Parts of a condensation product of bisphenol A and epichlorohydrin, which had an average molecular weight of 2900, and 30 parts of a butyl ether-urea-formaldehyde resin were dissolved in (I) a mixed solvent comprising 50 parts of dioxane, 15 parts of xylene, 15 parts of cyclohexanone, 10 parts of methylethyl ketone and 10 parts of toluene or (II) a mixed solvent comprising 50 parts of methylethyl ketone and 50 parts of toluene to form a solution (I) or (II) having a solid content of 25%. Solution (I) was used as the base paint in sample number 24 in Example 4, and solution (II) was used as the base paint in sample numbers 20 to 23 and 25 in Examples 4 and 6 respectively.

(2) Epoxy-Phenol Type Resin Solution:

In 1.5 mols of a 37% aqueous solution of formaldehyde were dissolved 0.5 mol carbolic acid and 0.5 mol of p-cresol, and 0.15 mol of ammonia was added as a catalyst and reaction was carried out at 95° C. for 3 hours. The reaction product was extracted with a mixed solvent comprising ketone, alcohol and hydrocarbon, and the extract was washed with water and the water layer was removed. Residual water was removed by azeotropic distillation, and the residue was cooled to form a 30% solution of a resol type phenolic resin. This resol type phenolic resin solution was mixed with a 30% solution of an epoxy resin having a molecular weight of 2900, which was a condensation product of bisphenol A and epichlorohydrin, in a mixed solvent comprising ketone, ester, alcohol and hydrocarbon. The weight ratio of the phenolic resin to the epoxy resin was 40/60. This mixture was pre-condensed under reflux for 2 hours to form an epoxy-phenol resin solution. This solution was used as the base paint in Examples 1, 2, 3 and 5.

Welded can bodies used in the Examples were prepared according to the following procedures.

In case of welded tinplate cans used in Examples 3 and 5, an epoxy-phenol type paint (a 1/1 mixture of an epoxy resin and a phenolic resin) was margin-coated on a tinplate having a thickness of 0.21 mm, a hardness of T-4, a plated tin amount of 50 lb/B.B and a tin layer thickness of 1.2 μm, except the area of the side seam of the can body, so that the thickness of the coating after baking was 5 μm on the inner face side and 3 μm on the outer face side, and the applied paint was baked and cured for 10 minutes in a hot air drying furnace maintained at 200° C. The coated tinplate was cut into a body blank of can having a length of 206.4 mm and a height of 104.5 mm, and the blank is formed into a cylinder by a roll former so that the short side was located in the axial direction. In the welding station, the cut edges were lapped and fixed, and by using a commercially available seam welding machine comprising two roll electrodes disposed through a wire electrode and an inert gas feed nozzle, a pressing force of 40 Kg/mm$^2$ was applied to the lapped portion of the formed cylinder and a welded can having a diameter of 2×11/16 inches and an inner volume of 318.2 ml at a can manufacturing speed of 30 m/min in a nitrogen gas current supplied at a rate of 5 l/min. The lap width before welding was 0.3 mm and the lap width after welding was 0.4 mm.

In Example 1, welded cans prepared in the same manner as described above in a nitrogen gas current or air current supplied at a flow rate shown below were used.

In case of welded TFS welded cans, an epoxy-phenol type resin (1/1 mixture of an epoxy resin and a phenolic resin) was margin-coated on a TFS plate having a thickness of 0.17 mm and a hardness of T-4 except the area of the side seam of the can body so that the thickness of the coating after baking was 5 μm on the inner face side and 3 μm of the outer face side, and the coated paint was baked and cured for 10 minutes in a hot air drying furnace maintained at 200° C. The coated TFS plate was cut into a body blank of can having a length of 206.4 mm and a height of 104.5 mm. Both surfaces of the portion 6 near the cut edges, which were to be lapped together, were subjected to edge cleaning by the cutting method along the width of about 1 mm from each cut edge, whereby the surface chromium layer and chromium oxide layer were removed. The edge-cleaned blank was formed into a cylinder so that the short side was located in the axial direction. The cut edges were lapped and fixed in the welding station, and by using a commercially available seam welding machine comprising two roll electrodes disposed through a wire electrode and an inert gas supply nozzle, a pressing force of 40 Kg/mm$^2$ was applied to the lapped cut edges of the cylinder and a welded can body having a diameter of 2×11/16 inches and an inner volume of 318.2 ml at a can manufacturing speed of 30 m/min in a current of a mixed inert gas (90 mol % of nitrogen and 10 mol % of hydrogen) supplied at a rate of 5 l/min. The lap width before welding was 0.3 mm and the lap width after welding was 0.4 mm.

In Example 2, welded TFS can bodies prepared in the same manner as described above in a mixed gas current or air current supplied at a flow rate described hereinafter were used.

In the Examples, the properties of cans, the physical properties of paints and the structural and physical properties of the coatings near can side seams were determined and evaluated according to the following methods, and the surface metal layers of the welded portions were analyzed according to the methods described below.

(1) Contact Angle

A micro slide glass sheet (grade 1: thickness=0.9-1.2 mm) was used as the glass sheet, and the glass sheet was dipped in mixed chromic acid overnight and washed with water sufficiently. The glass sheet was dried and stored in the absolutely dry condition in a desiccator.

The measurement was carried out in a thermostat chamber maintained at 25° C. and in an air atmosphere, 0.2 mm$^3$ of the sample paint was dropped on the glass sheet by a micro syringe. After passage of 1 minute, the contact angle was directly read from a goniometer.

(2) Analysis of Surface Metal Layers of Welded Portion:

(a) Thickness of Surface Oxide Layer:

Only the welded lap portions were cut out from the welded can, and the cut pieces were connected by an adhesive tape to form a sample having a size of 8 mm×8 mm. The surface of the sample was etched with Ar gas and the atomic concentration ratio of O, Fe and Sn (in case of welded tinplate cans) was measured according to the ESCA method. Since oxygen in the oxide was etched at a rate of 15 Å/min and the atomic concentration ratio of oxygen was substantially kept constant at 10 to 20% while etching was continued, the thickness of the portion where the atomic concentration ratio was higher than 20% was measured and this thickness was defined as the thickness of the oxide layer.

(b) Thickness of Alloy Layer (in case of welded tinplate cans):

Only the welded lap portions were cut out from the welded can and the cut pieces were connected by an adhesive tape to form a sample having a size of 15 mm×15 mm. The sample was electrolytically treated in an NaOH solution to remove free Sn from the surface of the welded portion. Then, the amount of Sn in the alloy layer was determined according to the X-ray fluorometry, and the thickness of the alloy layer was calculated based on the assumption that 1 g/m$^2$ of the amount of Sn in the alloy layer corresponding to the thickness of 0.144 μm. In case of free Sn, the thickness was calculated based on the assumption that 1 g/m$^2$ of the amount of Sn corresponded to the thickness of 0.137 μm.

(3) Observation of Dispersion State:

The cured coating was peeled off from the side seam portion of the can body, and a test piece having a width of 2 mm and a length of 15 mm was cut out in parallel to the side seam. This test piece was embedded and solidified in an epoxy resin and a slide having a thickness of about 15 μm was cut out by a stainless steel microtome so that a section vertical to the seam was obtained. The slide was dipped in an aqueous solution of a blue dye (Methyl Violet) for 10 minutes at normal temperatures to selectively dye the thermosetting resin. The dyed slice was washed with water sufficiently, and the structure, especially the dispersion state, was observed by an optical microscope. The observed structure was photographed and the average particle size of particles present in the visual field at the time of observation was measured. The number average particle size was adopted as the average particle size. The number average particle size will be referred to merely as "particle size" or "average particle size" hereinafter.

(4) Side Seam-Covering Property (current value at constant voltage electrolysis):

The side seam of the can body formed by coating, baking and curing of the sample paint was cut out along a width of 2 cm, and a portion having a width of 3 mm in a direction rectangular to the side seam and a length of 100 mm in a direction parallel to the side seam was removed and the remaining side seam was sealed by an adhesive vinyl tape to form a test piece. This test piece was dipped for 3 minutes in an electrolyte consisting of a 3% aqueous solution of sodium chloride and maintained at 25° C. Then, the test piece was subjected to the constant voltage electrolysis for 10 seconds under a voltage of 10.0 V by using a carbon rod as a counter electrode and the average value of the flowing current was measured. Five test pieces were tested with respect to one sample and the arithmetic mean value was calculated.

(5) Processability:

A test piece having a width of 40 mm and a length of 60 mm with the side seam being as the center was cut out from the side seamed can body formed by coating, baking and curing of the sample paint. The flexural strength test was carried out according to the bending resistance test method of JIS K-5400, 6-16.

From the test piece which had been subjected to the flexural strength test, a portion having a width of 3 mm with the side seam being the center and a length of 6 mm in parallel to the side seam with the bent top end being the center was removed, and the remaining portion was sealed by an adhesive vinyl tap and was subjected to constant voltage electrolysis under the same conditions as described in (4) above. Five test pieces were tested with respect to one sample, and the arithmetic mean value was calculated.

(6) Adhesion:

Square cuts having a side of 1 mm were formed on the coating of the welded side seam portion after baking and curing, and an adhesive cellophane tape was applied to the coating and the peel test was then carried out. The test was made on five optionally chosen cans with respect to one sample paint, and the obtained results were evaluated as follows:

○ : no peel observed in any can
Δ: peel observed in 1 or 2 cans
X: peel observed in 3 or more cans (7) Necked-In Processability:

The presence or absence of defects such as peeling and cracking on the coating of the side seam portion was checked after necked-in processing. The test was made on optionally chosen 50 cans with respect to one sample paint.

(8) Evaluation of Actually Packed Cans:
(a) Amount of formed hydrogen:

At the time of opening, the gas in the can was collected and the amount of hydrogen was determined according to gas chromatography. Ten cans were tested with respect to one sample, and the arithmetic mean value was calculated. When swollen cans were formed, this fact was indicated.

(b) Amount of iron dissolved out:

Cans packed with an apple drink or consomme were tested. After opening, all the content was reduced to ashes. The ashes were dissolved in hydrochloric acid and the supernatant was subjected to the atomic absorption spectroscopy to determine the amount of iron in content. Optionally chosen 10 cans were tested with one sample, and the arithmetic mean value was calculated.

(c) Perforation and state of welded side seam portion on inner face of can:

Packed cans were stored at 37° C. for 1 year and leakage of the content (liquid) was checked by observation with the naked eye. Cans where leakage of the content was observed were picked up and the portions near the side seams were observed by a microscope after opening. Cans having pierced holes were designated as "perforated cans", and the ratio of the number of perforated cans to the total number of tested cans was calculated. After opening, the corrosion state of the portion near the side seam was checked by observation with the naked eye or by microscopic observation. With respect to one sample paint, 100 cans were tested to the storage test, and the corrosion state was examined on optionally chosen 50 cans.

EXAMPLE 1

A powder having an average particle size of about 10 $\mu$m, which was obtained by mechanically pulverizing from the pellets of nylon 12 having a softening point of 178° C. and a carbonyl group concentration of 508 meq per 100 g of the polymer, was used as the thermoplastic resin powder, and the above-mentioned epoxy-phenol type resin solution was used as the thermosetting resin solution. By using the same diluent solvent as used for the thermosetting resin solution, both resins were mixed by a high speed mixer to obtain a paint having a solid content of about 25%, in which the ratio of the thermoplastic resin to the thermosetting resin in the solids was 30/70.

In order to obtain welded tinplate can bodies differing in structure of the surface metal layer in the welded side seam portion, nitrogen current flow rates of 20 l/min (sample No. 1), 5 l/min (sample No. 2) and 2 l/min (sample No. 3) were adopted, respectively, for the welding operation. For comparison, the flow rate of the nitrogen current was reduced to 0.2 l/min (sample No. 4), and the welding operation was carried out in air (sample No. 5). Other welding conditions were the same as described hereinbefore.

With respect to each of the so obtained can bodies, the above-mentioned paint was spray-coated on the inner and outer surfaces of the side seam portion of the can body along a width of about 10 mm by an airless spray gun while maintaining the paint temperature at 40° to 70° C. during the spraying operation, so that the thickness of the coating after drying was 40 $\mu$m. Then, hot air was blown to the coated can from below for about 10 seconds in the state where the side seam on the inner face of the can was located above, whereby the solvent was substantially evaporated. The coated paint was then baked and cured in a gas oven maintained at 220° C. for about 60 seconds to obtain a can body having a coated side seam.

The so obtained can body was tested with respect to items shown in Table 1, and the surface metal layer of the welded portion of the welded can body before the coating operation was analyzed.

The so obtained can body having a coated side seam was subjected to bead processing, necked-in processing and flange processing, and a tinplate lid for a can having an inner diameter of 2 9/16 inches, which had an epoxy-phenol coating on each of the inner and outer surfaces, was double-seamed to the processed can body. An apple drink heated at 90° C. or tomato sauce was packed in the obtained empty can, and the same tinplate lid as described above was double-seamed to the packed can by a vacuum seamer. The can packed with the tomato sauce was subjected to heat sterilization at 118° C. for 90 minutes. Each packed can was stored at 37° C. for 1 year.

With respect to each sample, 100 cans were prepared and tested. The amount of iron dissolved out and the amount of formed hydrogen were determined with optionally chosen 10 cans, and 50 cans optionally chosen from the remaining cans were opened and the corrosion state of the side seam portion of the can body was examined.

The obtained results are shown in Table 1.

operation. For comparison, the flow rate of the nitrogen current was reduced to 0.2 l/min (sample No. 9), and the welding operation was carried out in air (sample No. 10). Other welding conditions were the same as described hereinbefore. Furthermore, sample No. 6 was subjected to acid washing (pickling) with an aqueous solution containing 70 g/l of sulfuric acid for 30 seconds (sample No. 11).

With respect to each of the so obtained can bodies, the above-mentioned paint was spray-coated on the inner and outer surfaces of the side seam portion of the can body along a width of about 10 mm by an airless spray gun while maintaining the paint temperature at 40° to 70° C. during the spraying operation, so that the thickness of the coating after drying was 40 μm. Then, hot air was blown to the coated can from below for about 10 seconds in the state where the side seam on the inner face of the can was located above, whereby the solvent was substantially evaporated. The coated paint was then baked and cured in a gas oven maintained at 220° C. for about 60 seconds to obtain a can body having a coated side seam.

The so obtained can body was tested with respect to items shown in Table 2, and the surface metal layer of the welded portion of the welded can body before the

TABLE 1

| Sample No. | Results of Analysis of Surface Metal Layer of Welded Portion | | Side Seam-Covering Property (mA/300 mm²) | Processability (mA/18 mm²) | Adhesion | State of Necked-in Processed Portion |
|---|---|---|---|---|---|---|
| | thickness (Å) of surface oxide layer | ratio (%) of thickness of alloy layer to total plating thickness | | | | |
| Samples of Present Invention | | | | | | |
| 1 | 60–70 | 7–10 | 0 | 0 | ○ | no change |
| 2 | 150–170 | 60–71 | 0 | 0 | ○ | no change |
| 3 | 350–380 | 90–95 | 0 | 0 | ○ | no change |
| Comparative Samples | | | | | | |
| 4 | 700–800 | 3–6 | 0 | 6.2 | Δ | no change |
| 5 | 1400–1600 | 15–23 | 0 | 1.0 | X | peeling in some cans |

| | Packed Can Test Results | | | | | |
|---|---|---|---|---|---|---|
| | apple drink | | | tomato sauce | | |
| Sample No. | amount (ppm) of iron dissolved out | state of side seam | number perforated cans | amount (ml/can) of formed hydrogen | state of side seam | number of perforated cans |
| Samples of Present Invention | | | | | | |
| 1 | 5.4 | no change | 0 | 0.13 | no change | 0 |
| 2 | 4.4 | no change | 0 | 0.12 | no change | 0 |
| 3 | 6.2 | no change | 0 | 0.19 | no change | 0 |
| Comparative Samples | | | | | | |
| 4 | 9.2 | blister of processed portion in some cans | 0 | 2.11 | blister in processed portion red rust | 1 |
| 5 | 13.3 | blister in processed portion | 0 | some cans swollen | blister in processed portion, red rust | 8 |

EXAMPLE 2

The same side seam coating paint was used in Example 1 was used.

In order to obtain welded TFS can bodies differing in structure of the surface metal layer in the welded portion, the above-mentioned inert gas mixture current flow rates of 20 l/min (sample No. 6), 5 l/min (sample No. 7) and nitrogen current flow rates of 2 l/min (sample No. 8) were adopted, respectively, for the welding coating operation was analyzed.

The so obtained can body having a coated side seam was subjected to bead processing, necked-in processing and flange processing, and a TFS lid for a can having an inner diameter of 2 9/16 inches, which had an epoxy-phenol coating on each of the inner and outer surfaces, was double-seamed to the processed can body. An apple drink heated at 90° C. or tomato sauce was packed in the obtained empty can, and the same TFS lid as described above was double-seamed to the packed can by a vacuum seamer. The can packed with the tomato sauce was subjected to heat sterilization at 118° C. for 90 minutes. Each packed can was stored at 37° C. for 1 year.

With respect to each sample, 100 cans were prepared and tested. The amount of iron dissolved out and the amount of formed hydrogen were determined with optionally chosen 10 cans, and 50 cans optionally chosen from the remaining cans were opened and the corrosion state of the side seam portion of the can body was examined.

The obtained results are shown in Table 2.

ratio of the alloy layer to the total plating thickness=55–70%) along a width of about 10 mm by an airless spray gun while maintaining the paint temperature at 40° to 70° C. during the spraying operation, so that the thickness of the coating after drying was 40 μm. Then, hot air was blown to the coated can from below for about 10 seconds in the state where the side seam on the inner face of the can was located above, whereby the solvent was substantially evaporated. The coated paint was then baked and cured in a gas oven maintained at 220° C. for about 60 seconds to obtain a can body having a coated side seam.

The so obtained can body was tested with respect to items shown in Table 3, and the structure of the coating

TABLE 2

| Sample No. | Results of Analysis of Surface Metal Layer of Welded Portion thickness (Å) of magnetite layer | Side Seam-Covering Property (mA/300 mm²) | Processability (mA/18 mm²) | Adhesion | State of Necked-In Processed Portion |
|---|---|---|---|---|---|
| Samples of Present Invention | | | | | |
| 6 | 80–100 | 0 | 0 | O | no change |
| 7 | 250–280 | 0 | 0 | O | no change |
| 8 | 600–700 | 0 | 0 | O | no change |
| Comparatives Samples | | | | | |
| 9 | 1300–1400 | 0 | 0.3 | Δ | partially peeled |
| 10 | 200–2200 | 0 | 1.2 | X | peeled |
| 11 | below 10 | 0 | 0.1 | Δ | partially peeled |

| | Packed Can Test Results | | | | | |
|---|---|---|---|---|---|---|
| | apple drink | | | tomato sauce | | |
| Sample No. | amount (ppm) of iron dissolved out | state of side seam | number of perforated cans | amount (ml/can) of formed hydrogen | state of side seam | number of perforated cans |
| Samples of Present Invention | | | | | | |
| 6 | 1.2 | no change | 0 | 0.06 | no change | 0 |
| 7 | 1.8 | no change | 0 | 0.08 | no change | 0 |
| 8 | 1.4 | no change | 0 | 0.07 | no change | 0 |
| Comparative Samples | | | | | | |
| 9 | 4.2 | blister in processed portion in some cans | 0 | 0.51 | blister in processed portion in some cans, red rust | 0 |
| 10 | 17.3 | blister in processed portion | 0 | some cans swollen | blister in processed portion, red rust | 12 |
| 11 | 3.5 | blister in processed portion in some cans | 0 | 0.43 | blister in processed portion in some cans | 1 |

EXAMPLE 3

The above-mentioned epoxy-phenol resin solution was used as the thermosetting paint. Nylon 12 having a softening point of 178° C. as determined according to the ring and ball method and a carbonyl group concentration of 508 meq per 100 g of the polymer was used as the thermoplastic resin. Pellets of the thermoplastic resin were mechanically pulverized to obtain a powder having an average particle size of about 25μ. The powder was incorporated in the thermosetting resin solution so that the volumne ratio as solids of both the resins was controlled as shown in Table 3. The mixture was stirred for 20 minutes by a high speed mixer to form a side seam-coating paint.

The contact angles of the so prepared paints were measured to obtain the results shown in Table 3.

With respect to welded tinplate can bodies prepared according to the above-mentioned method, the so prepared paint was spray-coated on the inner and outer surfaces of the seam portion of the can body (thickness of the surface iron oxide layer=170–190 Å, thickness layer of the welded can body was observed.

The so obtained can body having a coated side seam was subjected to bead processing, necked-in processing and flange processing, and a tinplate lid for a can having an inner diameter of 2 9/16 inches mm, which had an epoxyphenol coating on each of the inner and outer surfaces, was double-seamed to the processed can body. Consomme or tomato sauce was packed in the obtained empty can, and the same tinplate lid as described above was double-seamed to the packed can body a vacuum seamer. These packed cans were subjected to heat sterilization at 118° C. for 90 minutes. Each packed can was stored at 37° C. for 1 year.

With respect to each sample, 100 cans were prepared and tested. The amount of iron dissolved out and the amount of formed hydrogen were determined with optionally chosen 10 cans, and 50 cans optionally chosen from the remaining cans were opened and the corrosion state of the seam portion of the can body was examined.

The obtained results are shown in Table 3.

TABLE 3

| Sample No. | Volume Ratio of Thermoplastic Resin to Thermosetting Resins | Contact Angle (degrees) | Dispersion State | Side Seam-Covering Property (mA/300 m²) | Processability (mA/18 mm²) | Adhesion | State of Necked-In Processed Portion | Packed Can Test Results — consomme: amount (ppm) of iron dissolved out | state of side seam | number of perforated cans | Packed Can Test Results — tomato sauce: amount (ml/can) of formed hydrogen | state of side seam | number of perforated cans |
|---|---|---|---|---|---|---|---|---|---|---|---|---|---|
| Samples of Present Invention | | | | | | | | | | | | | |
| 12 | 7/93 | 23.6 | nylon particles having particle size of about 22μ uniformly dispersed in continuous phase of thermosetting resin | 0 | 0 | ○ | no change | 0.2 | no change | 0 | 0.15 | no change | 0 |
| 13 | 20/80 | 29.0 | nylon particles having particle size of about 22μ uniformly dispersed in continuous phase of thermosetting resin | 0 | 0 | ○ | no change | 0.4 | no change | 0 | 0.14 | no change | 0 |
| 14 | 40/60 | 36.2 | nylon particles having particle size of about 23μ dispersed in continuous phase of thermosetting resin with particle blocking | 0 | 0 | ○ | no change | 0.3 | no change | 0 | 0.17 | no change | 0 |
| 15 | 85/15 | 30.1 | thermosetting resin particles having particle size of 5-20μ dispersed in continuous phase of nylon | 0 | 0 | ○ | no change | 0.2 | no change | 0 | 0.16 | no change | 0 |
| 16 | 98/2 | 20.1 | Thermosetting resin particles having particle size of 2-8μ dispersed in continuous phase of nylon | 0 | 0 | ○ | no change | 0.3 | no change | 0 | 0.21 | no change | 0 |
| Comparative Samples | | | | | | | | | | | | | |
| 17 | 0/100 | 18.1 | — | 2.5 | 8.4 | ○ | peeled | 13.2 | spot corrosion | 7 | some cans swollen | spot corrosion | 20 |
| 18 | 77/23 | 38.1 | both nylon and thermosetting resin formed continuous phases, uneven composition | 1.1 | 2.1 | ○ | no change | 6.2 | spot corrosion | 0 | 2.3 | spot corrosion in some cans | 1 |
| 19 | 100/0 | 16.5 | — | 0 | 0 | △ | no change | 5.1 | blister | 1 | swollen cans | blister | 5 |

EXAMPLE 4

In samples other than sample No. 24, the above-mentioned epoxy-urea resin solution (II) was used as the thermosetting paint, and the above-mentioned epoxy urea resin solution (I) was used in sample No. 24. A polybutylene terephthalate (PBT)/polybutylene isophthalate (PBI) copolymer having a PBT content of 80 mol %, a carbonyl group concentration of 909 meq/100 g of the polymer and a softening point of 205° C. as determined according to the ring and ball method was used as the thermoplastic resin. In samples Nos. 22, 23 and 25, pellets of the thermoplastic resin were mechanically pulverized at normal temperatures and then sieved. In samples Nos. 21 and 24, pellets of the thermoplastic resin were frozen with liquefied nitrogen and pulverized, and particles having an average particle size of about 15μ were used. In sample 20, pellets of the thermoplastic resin were dissolved in a solvent at a high temperature and the temperature of the solution was gradually lowered to precipitate particles. The resin powder was incorporated in the above paint so that the volume ratio as solids of the powder was 25%. The mixture was stirred by a high speed mixer for 20 minutes to form a side seam coating paint.

The contact angles of the so formed paints were determined according to the above-mentioned method to obtain the results shown in Table 4.

The above-mentioned paint was spray-coated on the inner and outer surfaces of the side seam portion of a TFS can body obtained according to the above-mentioned method (having a magnetite layer thickness of 220–250 Å) along a width of about 10 mm by an airless spray gun while maintaining the paint temperature at 40° to 70° C. during the spraying operation, so that the thickness of the coating after drying was 40 to 60 μml. Then, hot air was blown to the coated can from below for about 10 seconds in the state where the side seam on the inner face of the can was located above, whereby the solvent was substantially evaporated. The coated paint was then baked and cured in a gas oven maintained at 220° C. for about 30 seconds to obtain a can body having a coated side seam.

The so obtained can body was treated with respect to items shown in Table 4, and the state of the thermoplastic resin powder dispersed in the cured coating was observed.

The so obtained can body having a coated side seam was subjected to flange processing, and a TFS lid for a can having an inner diameter of 2 11/16 inches, which had an epoxy-phenol coating on each of the inner and outer surfaces, was double-seamed to the processed can body. Consomme or tomato sauce was packed in the obtained empty can, and the same TFS lid as described above was double-seamed to the packed can by a vacuum seamer. The packed can was subjected to the heating sterilization at 118° C. for 90 minutes. Each packed can was stored at 37° C. for 1 year.

With respect to each sample, 100 cans were prepared and tested. The amount of iron dissolved out and the amount of formed hydrogen was determined with optionally chosen 10 cans, and 50 cans optionally chosen from the remaining cans were opened and the corrosion state of the seam portion of the can body was examined.

The obtained results are shown in Table 4.

TABLE 4

| Sample No. | Average Particle Size (mμ) of Thermoplastic Resin | Contact Angle (degrees) | Dispersion State | Side Seam-Covering (mA/300 mm²) | Processability (mA/18 mm²) | Adhesion |
|---|---|---|---|---|---|---|
| Samples of Present Invention | | | | | | |
| 20 | 1.1 | 35.1 | thermoplastic resin particles having particle size of about 1μ dispersed in continuous phase of thermosetting resin substantially uniformly | 0 | 0 | O |
| 21 | 15 | 30.3 | thermoplastic resin particles having particle size of about 13μ dispersed in continuous phase of thermosetting resin substantially uniformly | 0 | 0 | O |
| 22 | 50 | 27.2 | thermoplastic resin particles having particle size of about 40μ dispersed in continuous phase of thermosetting resin | 0 | 0 | O |
| 23 | 70 | 24.1 | thermoplastic resin particles having particle size of about 50μ dispersed in continuous phase of thermosetting resin | 0 | 0 | O |
| Comparative Samples | | | | | | |
| 24 | 15 | 18.6 | substantially homogeneous phase, presence of thermoplastic resin particles not confirmed | 0.3 | 0.3 | O |
| 25 | 100 | 18.6 | continuous phase of thermosetting resin formed but dispersion state of thermoplastic resin particles not good | 0.5 | 5.1 | O |

| | Packed Can Test Results | | | | | |
|---|---|---|---|---|---|---|
| | consomme | | | tomato sauce | | |
| Sample No. | amount (ppm) of iron dissolved out | state of side seam | number perforated cans | amount (ml/can) of formed hydrogen | state of side seam | number perforated cans |
| Samples of Present Invention | | | | | | |
| 20 | 0.02 | no change | 0 | 0.04 | no change | 0 |
| 21 | 0.09 | no change | 0 | 0.06 | no change | 0 |
| 22 | 0.06 | no change | 0 | 0.08 | no change | 0 |

TABLE 4-continued

| 23 | 0.13 | no change | 0 | 0.10 | no change | 0 |
|---|---|---|---|---|---|---|
| Comparative Samples | | | | | | |
| 24 | 1.24 | spot corrosion | 0 | swollen cans | spot corrosion | 14 |
| 25 | 2.7 | blister | 0 | swollen cans | spot corrosion in some cans | 12 |

EXAMPLE 5

A powder of a thermoplastic resin shown in Table 5 was used, and the above-mentioned epoxy-phenol type resin solution was used as the thermosetting resin paint. The powder was formed mainly by mechanical pulverization to adjust the average particle size to a value shown in Table 5. The powder was incorporated into the thermosetting resin solution so that the volume ratio as solids of the thermoplastic resin to the thermosetting resin was 85/15. At this step, the same solvent as used for the thermosetting resin solution was used as the diluent. The mixture was stirred by a high speed mixer to form a paint solution.

The contact angles on glass plate of these paints were not remarkably dependent on the kind of thermoplastic resins for sample Nos. 26–32 within 26–33 degrees and 22 degrees for sample No. 33.

The above-mentioned paint was spray-coated on the inner and outer surfaces of the seam portion of the tinplate can body prepared according to the above-mentioned method along a width of about 10 mm by an airless spray gun while maintaining the paint temperature at 40° to 70° C. during the spraying operation, so that the thickness of the coating after drying was 50 μm. Then, hot air was blown to the coated can from below for about 10 seconds in the state where the seam on the inner face of the can was located above, whereby the solvent was substantially evaporated. The coated paint was then baked and cured in a gas oven maintained at 220° C. for about 60 seconds to obtain a can body having a coated side seam.

The so obtained can body was tested with respect to items shown in Table 5, and the dispersion state of the thermoplastic resin powder in the cured coating was observed.

The so obtained can body having a coated side seam was subjected to bead processing, necked-in processing and flange processing, and a tinplate lid for a can having an inner diameter of 65.3 mm, which had an epoxy-phenol coating on each of the inner and outer surfaces, was double-seamed to the processed can body. An apple drink heated at 90° C. or tomato sauce was packed in the obtained empty can, and the same tinplate lid as described above was double-seamed to the packed can by a vacuum seamer. The can packed with the tomato source was subjected to the heating sterilization at 118° C. for 90 minutes. Each packed can was stored at 37° C. for 1 year.

With respect to each sample, 100 cans were prepared and tested. The amount of iron dissolved out and the amount of formed hydrogen were determined with optionally chosen 10 cans, and 50 cans optionally chosen from the remaining cans were opened and the corrosion state of the side seam portion of the can body was examined.

The obtained results are shown in Table 5.

TABLE 5

| Sample No. | Thermoplastic Resin Powder [softening point (°C), carbonyl group concentration (meq/100 g of polymer) average particle size (μm)] | Dispersion State | Side Seam-Covering Property (mA/300 mm²) | Processability (mA/18 mm²) | Adhesion | State of Necked-in Processed Portion | apple drink amount (ppm) of iron dissolved out | apple drink state of side seam | apple drink number of perforated cans | tomato sauce amount (ml/can) of formed hydrogen | tomato sauce state of side seam | tomato sauce number of perforated cans |
|---|---|---|---|---|---|---|---|---|---|---|---|---|
| Samples of Present Invention | | | | | | | | | | | | |
| 26 | polybutylene terephthalate (222, 909, 20) | thermoplastic resin particles having particle size of about 18μ dispersed in continuous phase of thermosetting resin substantially uniformly | 0 | 0 | ○ | no change | 5.2 | no change | 0 | 0.19 | no change | 0 |
| 27 | polyethylene terephthalate/polypropylene terephthalate copolymer (205, 1028, 15) | thermoplastic resin particles having particle size of about 14μ dispersed in continuous phase of thermosetting resin substantially uniformly | 0 | 0 | ○ | no change | 4.7 | no change | 0 | 0.20 | no change | 0 |
| 28 | maleic acid-modified polypropylene (165, 80, 10) | thermoplastic resin particles having particle size of about 10μ dispersed in continuous phase of thermosetting resin with partial blocking | 0 | 0 | ○ | no change | 6.3 | no change | 0 | 0.38 | no change | 0 |
| 29 | polycarbonate (150, 394, 20) | thermoplastic resin particles having particle size of about μ dispersed in continuous phase of thermosetting resin substantially uniformly | 0 | 0 | ○ | no change | 6.2 | no change | 0 | 0.34 | no change | 0 |
| 30 | nylon 6/nylon copolymer (140, 644, 30) | thermoplastic resin particles having particle size of about 25μ dispersed in continuous phase of thermosetting resin substantially uniformly | 0 | 0 | ○ | no change | 4.2 | no change | 0 | 0.33 | no change | 0 |
| Comparative Samples | | | | | | | | | | | | |
| 31 | ethylene-propylene copolymer (−30, 0, 50) | prominent blocking of thermoplastic resin particles | 0.1 | 0.3 | △ | no change | 13.2 | spot corrosion in some cans | 0 | 5.2 | spot corrosion substantially on entire surface | 3 |
| 32 | polyethylene (105, 0, 50) | localized distribution thermoplastic resin particles on surface of coating, prominent blocking | 0 | 0.2 | △ | partially peeled | 8.8 | spot corrosion in some cans | 0 | 6.2 | spot corrosion substantially on entire surface | 2 |
| 33 | polyvinyl chloride (90, 0, 5) | substantially homogeneous phase, presence of thermoplastic resin particles not confirmed | 2.1 | 0.5 | △ | no change | 18.3 | spot corrosion in some cans | 0 | 3.3 | spot corrosion in some cans | 6 |

EXAMPLE 6

A powder having an average particle size of about 20 μm, which was obtained by mechanically pulverizing pellets of nylon 11 having a softening point of 185° C. and a carbonyl group concentration of 546 meq per 100 g of the polymer, was used as the thermoplastic resin powder, and the above-mentioned epoxy-urea type resin solution (II) was used as the thermosetting resin solution. By using the same diluent solvent as used for the thermosetting resin solution, both the resins were mixed by a high speed mixer to obtain a paint having a solid content of about 25%, in which the ratio of the thermoplastic resin to the thermosetting resin in the solids was 20/80.

An epoxy-urea type paint (a 3/1 weight ratio mixture of an epoxy resin and a butylether-urea/formaldehyde resin) was coated, baked and cured on a tinplate having a thickness of 0.24 mm according to the above-mentioned method, and the coated tinplate was cut into a body blank having a length of 206.40 mm and a height of 125.40 mm, and a welded tinplate can body was prepared in a nitrogen current supplied at a flow rate of 5 l/min. When the surface metal layer of the welded portion was analyzed according to the above-mentioned method, it was found that the thickness of the iron oxide layer was 180 to 200 Å and the ratio of the thickness of the alloy layer to the total plating thickness was 40 to 60%.

The above-mentioned paint was spray-coated on the inner and outer surfaces of the side seam portion of the can body along a width of about 10 mm by an airless spray gun while maintaining the paint temperature at 40° to 70° C. during the spraying operation, so that the thickness of the coating after drying was 50 μm. Then, hot air was blown to the coated can from below for about 10 seconds in the state where the seam on the inner face of the can was located above, whereby the solvent was substantially evaporated. The coated paint was then baked and cured in a gas oven maintained at 220° C. for about 30 seconds to obtain a can body having a coated side seam.

The structure of the coating layer in the side seam portion was observed according to the above-mentioned method. It was found that thermoplastic resin particles having a particle size of about 17 μm were dispersed in the continuous phase of the thermosetting resin. The covering property and processability were examined according to the above-mentioned methods. It was found that both the non-processed portion and the portion subjected to the bending processing were completely covered and breaks or cracks were not formed by the processing.

The so obtained can body was subjected to necked-in processing and flange processing, and a tinplate lid for a can having an inner diameter of 2 9/16 inches and a domed top having an epoxy-phenol type coating on each of the inner and outer surfaces were double-seamed to the can body for aerosol. A glass cleaner or washing starch was packed in this empty can according to customary procedures. A mounting cap was attached and the packed can was stored at 45° C. for 3 or 6 months, and the change of the weight of the content was checked. With respect to each sample, 50 cans were opened and the absence or presence of corrosion in the side seam portion of the can body was examined. In each case, leakage or corrosion of the side seam portion was not observed at all.

What we claim is:

1. A side seam-coated welded can comprising a welded can body having a seam on the side face and a resin coating layer coating at lease one surface side of the seam, wherein said coating layer comprises a thermosetting resin suitable for paint manufacture and a thermoplastic resin having a softening point of 50° to 300° C. as determined according to the ring and ball method, at a volume ratio ranging (A) from 95/5 to 25/75 or (B) from 20/80 to 1/99, and one of said two resins is present in the coating in the form of a continuous phase and at lease a part of the other resin is present in the coating in the form of fine dispersed particles having a number average particle size of 0.1 to 80 μm, said thermoplastic resin containing in the main chain or side chain thereof carboxyl groups at a concentration of 12 to 1400 meq per 100 g of the polymer derived from a carboxylic acid, carboxylic acid salt, carboxylic acid anhydride, carboxylic acid ester, carboxylic acid amide, ketone, carbonic acid ester, urea or urethane and having at least a film-forming molecular weight.

2. A side seam-coated welded can according to claim 1 wherein the resin coating layer comprises a continuous phase of the thermosetting resin and a dispersed phase of particles of the thermoplastic resin having a number average particle size of 0.1 to 80 μm and a softening point of 50° to 300° C. as determined according to the ring and ball method, and the thermosetting resin and the thermoplastic resin are present at a volume ratio of from 95/5 to 25/75.

3. A side seam-coated welded can according to claim 1 wherein the resin coating layer contains the thermosetting resin and the thermoplastic resin at a volume ratio of from 20/80 to 1/99, the thermoplastic resin is present in the form of a continuous phase in the coating layer, a part of the thermosetting resin is present in the form of a thin continuous layer in the interface between the continuous phase of the thermoplastic resin and the inner face side of the side seam, and the remaining part of the thermosetting resin is present in the form of fine particles dispersed in the continuous phase of the thermoplastic resin.

4. A side seam-coated welded can according to any of claims 1 to 3 wherein the thermoplastic resin is a polyester, polycarbonate, polyamide, ionomer or acid-modified polyolefin.

5. A side seam-coated welded can according to any of claims 1 to 3 wherein the thermosetting resin is a combination of an epoxy resin with at least one member selected from the group consisting of phenolic resins, urea resins, melamine resins and thermosetting acrylic resins.

6. A side seam-coated welded can according to claim 1 wherein the welded can body is a welded tinplate seam can having a side seam formed by welding, each of the inner and outer surface portions of said side seam comprising an outermost layer composed of an oxide and having a thickness of 50 to 400 Å and a subsequent iron-tin alloy layer having a thickness corresponding to 5 to 100% of the total tin plating thickness of the starting tinplate.

7. A side seam-coated welded can according to claim 1 wherein the welded can body is a welded seam can formed by welding lapped edges of a cylinder formed from a can blank comprising a steel plate substrate and a coating layer formed on the steel plate substrate, which includes a metallic chromium layer and a chromium oxide layer formed thereon and the side seam has a steel plate substrate surface layer having a thickness of 50 to 800 Å and being composed of a fine and compact iron oxide consisting mainly of magnetite.

8. A side seamed-coated welded can according to claim 1 wherein the resin coating layer is formed by coating on the seam a paint comprising a dispersion medium consisting of a solution of the thermosetting resin in a solvent capable of dissolving the thermosetting resin but incapable of dissolving the thermoplastic resin and a dispersed phase consisting of particles of the thermoplastic resin having a number average particle size of 0.1 to 80 μm and a softening point of 50° to 330° C. as measured according to the ring and ball method, and baking the coated paint.

* * * * *